Inventor:
Johannes Heidenhain

July 2, 1957  J. HEIDENHAIN  2,797,614
PROJECTION MEASURING ARRANGEMENT WITH TRANSVERSE SCALE
Filed April 14, 1954  3 Sheets-Sheet 2

Inventor:
Johannes Heidenhain
By Young, Emery & Thompson
Attys.

July 2, 1957  J. HEIDENHAIN  2,797,614
PROJECTION MEASURING ARRANGEMENT WITH TRANSVERSE SCALE
Filed April 14, 1954  3 Sheets-Sheet 3
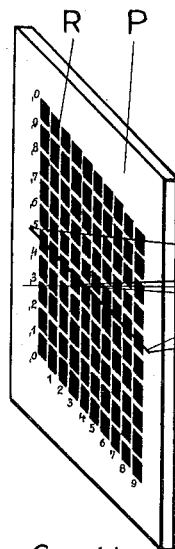
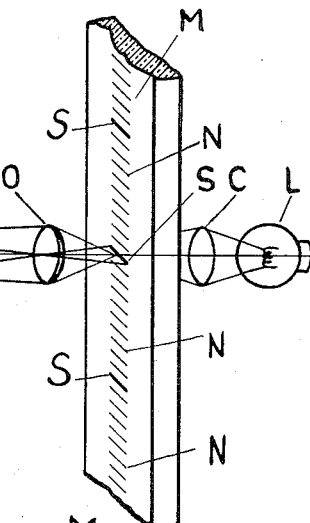
Fig. 2b.
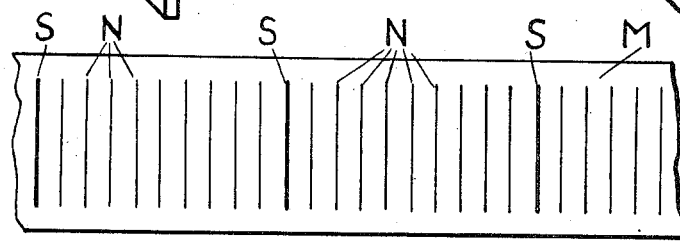
Fig. 4
Fig. 6
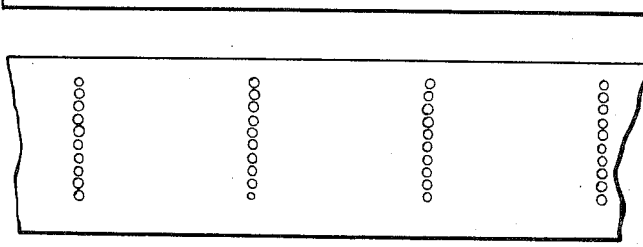
Fig. 8
Inventor;
Johannes Heidenhain
By
Young, Emery & Thompson
Attys.

United States Patent Office 2,797,614
Patented July 2, 1957

2,797,614

PROJECTION MEASURING ARRANGEMENT WITH TRANSVERSE SCALE

Johannes Heidenhain, Traunreut, near Traunstein, Germany

Application April 14, 1954, Serial No. 423,181

Claims priority, application Germany April 21, 1953

5 Claims. (Cl. 88—24)

This invention relates to a measuring arrangement with a scale for measuring instruments of all kinds, particularly for the dimensional adjustment of machine tools.

It is known to use a transverse rule for the precision reading of scales. The measuring graduation which serves to read off the graduation marks of a measuring rule or a circular graduation is in this case provided with stepped measuring lines. Transverse rules or scales of this type present severe disadvantages. It is very difficult to make the stepped line so fine, that the measured values may be read off with the necessary accuracy. Moreover, it is hardly possible to estimate the next decimal.

It is the object of the invention to obviate these drawbacks.

The invention resides substantially in the fact that the measuring lines of the transverse scale are in the form of measuring interspaces of constant width, which are of stepped shape, each of these interspaces being situated between two adjacent figures arranged in a stepped formation. Preferably, the sides of the individual steps of the figures defining the interspaces extend parallel to the graduation lines to be read, so that the second stage of subdivision may be read off by means of symmetry balancing. These sides of the steps of the figures are conveniently made straight. Preferably, the figures arranged in stepped formation consist of rectangles or squares. These figures are conveniently separated from each other by interspaces in a direction transversely of the direction of the measuring rule or scale.

The graduation to be read, for example a measuring rule or scale, a circular graduation or a measuring mark indicating the position of a part is preferably projected completely or in part, and generally at an enlarged scale, onto a measuring plate which is provided with the transverse measuring graduation. This measuring plate may be in the form of a ground glass projecting screen, a reflecting screen, or an eyepiece measuring plate.

The invention will now be described in more detail in connection with various embodiments and with reference to the accompanying drawings in which:

Fig. 2b is a diagrammatic view of the optical arrangement of the measuring device;

Fig. 4 shows a measuring rule with vernier graduation;

Fig. 6 illustrates a measuring scale with stepped graduation lines;

Fig. 8 shows a measuring scale with graduation marks in the form of circles.

Figures 1, 7:
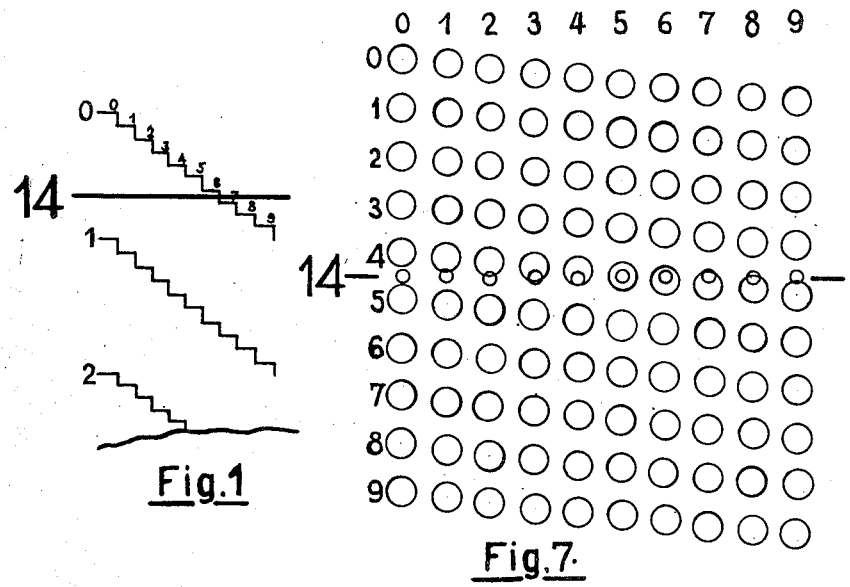
Fig. 1 shows a transverse measuring scale or rule of known type.
Fig. 7 shows a transverse measuring graduation with figures in the form of circular rings.

With the known type of transverse rule shown in Fig. 1, readings with the required accuracy of two or three decimals are very difficult to obtain, due to the fact that the stepped line can practically not be made thin enough.

Figures 2, 2A:
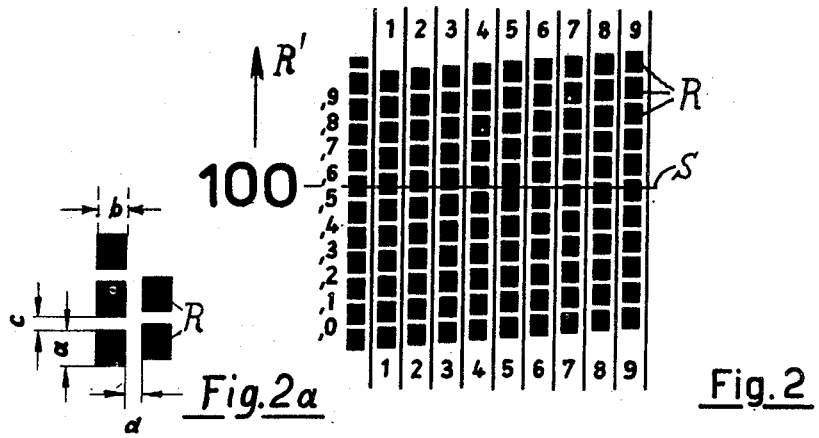
Fig. 2 is a transverse measuring graduation according to the invention.
Fig. 2a is an enlarged partial view of the measuring graduation of Fig. 2.

Contrary to this, the transverse measuring graduation according to the invention consists of figures which are separate from each other. As shown in Fig. 2, these figures preferably consist of rectangles R or of squares. The rectangles R are exactly alike and are separated from each other by interspaces. The transparency or reflectance of the rectangles is inferior to that of the interspaces. The rectangles may be merged by displacing them in two directions perpendicular to each other, without any rotation, i. e. the identical sides of the rectangles are parallel to each other. The rectangles R are arranged in $n$ rows which are parallel to each other and extend in the direction of motion R' of the measuring scale or rule, each row comprising $m+1$ rectangles. In Fig. 2a the rectangle sides extending in the direction of motion R' of the rule are designated $a$, while the rectangle sides extending transversely of the direction of motion R' of the rule are designated $b$. The rectangles R' comprised in a row extending in the direction of the measuring rule are in exact alignment, and are separted from each other by interspaces $c$. This direction of alignment is the same for all parallel rows of rectangles and coincides with the direction of motion of the images of the graduation lines on the measuring plate carrying the transverse measuring graduation. According to Fig. 2 this direction of alignment is vertical.

The length of the rectangle sides $a$ extending in the direction of motion R' of the rule, and the width of the interspaces $c$ lying in the same direction are so chosen, that the sum of $a+c$, i. e. the rectangle row period, is equal to the $m$th part of the scale interval projected onto the measuring plate. When choosing $m=10$, $a+c$ is equal to the 10th part of the scale interval. Each of the rows of rectangles extending in the direction of the rule, i. e. the rectangles arranged vertically above each other in Fig. 2, is offset in relation to the preceding row in the direction of motion R' of the rule, i. e. in the direction of their alignment by $$\frac{a+c}{n} \text{ ths} = \frac{p}{n} \text{ ths}$$

i. e. by the $n$th part of the rectangle row period $p$.

The width of the interspaces between the vertically extending individual rows of rectangles may be chosen as desired within wide limits. In the extreme case this width may be zero, so that the rectangles of each of the stepped rows extending transversely of the direction of motion R' of the rule in Fig. 2 combine to form one coherent figure.

An embodiment of a practical measuring arrangement according to the invention is illustrated in Fig. 2b. The rule M, which is illuminated by the lamp L through the condenser C is connected, for example, with the displaceable slide of a machine tool in such a manner, that it participates in the movements of the latter. The graduation line S of the rule M, which is situated within the field of vision of the objective O, is projected onto the measuring plate P as image S'. The figures of the transversal measuring graduation, in this case the rectangles R, are indicated only in diagrammatic form in Fig. 2b, their actual arrangement being that shown in Fig. 2.

The position of the measuring rule is read off by determining the interspace $c$ between two rectangles R of a vertical row, which is most symmetrically divided by the graduation line of the scale, resp. the image thereof. The number preceding the graduation line in the direction of motion of the rule will then indicate the position of the graduation line within an interval in $m$th intervals, while the number of the vertical rectangle row within which the interspace $c$ is most symmetrically divided, subdivides the $m$th interval into $n$ parts. When chosing $m=n=10$, measuring values according to the decimal system are obtained. If the measuring rule is divided into whole millimeters, the "$m$"-values will indicate the tenths and the "$n$"-values the hundredths parts of a millimeter.

Be it assumed for example, that the graduation line $S=100$ is situated within the field of vision of the objective O, as shown in Fig. 2. According to Fig. 2, one reads off: 100.5. Following this, one progresses horizontally, i. e. transversely of the direction R' of the rule, from one vertical row to the next towards the right, whereby it will be found, that the interspace $c$ of the vertical rectangle row 5 is symmetrically divided by the graduation line 100. This indicates the value 5 for the second decimal, so that the value to be read is: 100.55.

Figure 3A:
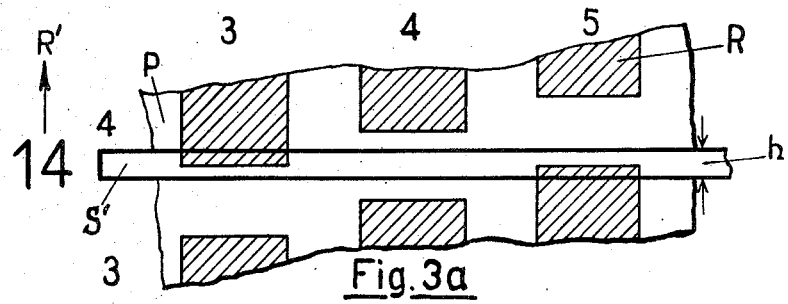
Figs. 3a and 3b are enlarged partial views of the measuring graduation with different positions of the measuring scale graduation line.
Figure 3B:
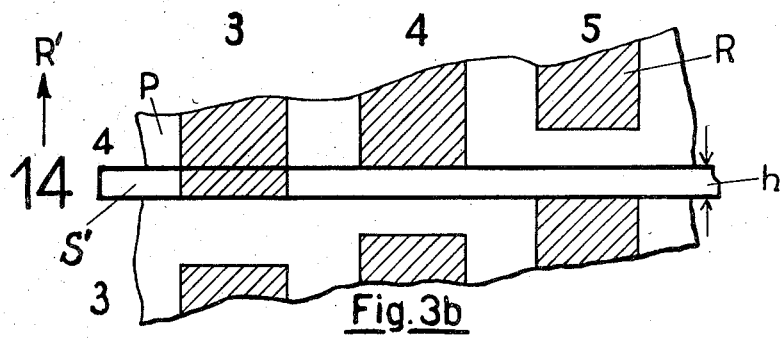

The width of the interspaces $c$ between two rectangles R of a vertical row, as well as the width $h$ of the graduation line, resp. its image, may be chosen as desired within wide limits (Figs. 3$a$ and 3$b$). Suitable selection of these widths affords the possibility of still more accurate reading. If a decimal system is taken as a basis, so that $m=n=10$ and consequently $a+c=p=0.1\cdot\beta$, wherein $\beta$ designates the magnification of the measuring rule on the measuring plate, and selecting $$c=\frac{2p}{10}=0.02\beta;\ t=(0.01-0.001)\cdot\beta$$

a value of 0.005 mm. can still be read off accurately, as shown in Figs. 3$a$ and 3$b$. The accuracy of reading may be further increased by estimating.

The additional use of the vernier principle will permit a still further increase in the accuracy of reading. If it is desired, for instance, to determine the $k$th part of the measuring rule interval which has already been divided into $m\cdot n$ parts, a series of $k-1$, resp. $k+1$ vernier lines N must be arranged contiguous to each of the graduation lines S of the rule M (Fig. 4), such vernier lines extending parallel to the graduation lines S and being separated from each other by a distance of $$\frac{1}{m}-\frac{1}{m.n.k}\ \text{respectively}\ \frac{1}{m}+\frac{1}{m.n.k}$$

intervals. The distance of the first vernier lines N relative to the corresponding graduation line S of the rule is of the same magnitude.

Figure 5:
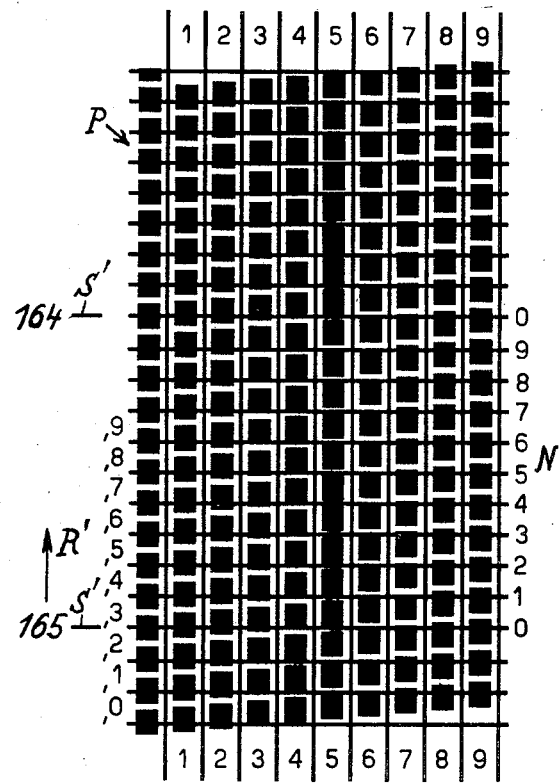
Fig. 5 shows the transverse measuring graduation in combination with a vernier scale.

As can be seen from Fig. 5, the interspace $c$ between two rectangles R of a vertical rectangle row, which is most symmetrically divided by the graduation line S is now determined in a manner similar to that shown in Figs. 2 and 2$a$, reading off the tenths and hundredths of a millimeter, resp. the $m$th and $m\cdot n$th intervals, as previously described. The next step is to find the vernier line N which divides the interspace between two rectangles of the same row into two exactly symmetrical parts. The number of this vernier line will then indicate the thousandths of a millimeter, resp. the $m\cdot n\cdot k$th intervals.

Thus, according to Fig. 5 for example, the value 165.2 will first be read off at the graduation line 165 of the measuring rule, without considering the vernier lines. After this one proceeds horizontally along the graduation line 165 towards the right to the vertical row 5, the interspace $c$ of which is most symmetrically divided by the graduation line 165. This will give the value 5 for the second decimal, so that the value read off will be 165.25. Subsequently one proceeds vertically and upwardly along the vertical row 5, whereby it is found that the vernier line 3 symmetrically divides the interspace $c$ in the vertical row 5. This indicates the value 3 for the third decimal. Thus, the complete value read off is 165.253. In this manner the invention affords the possibility of reading the second, and even the third decimal with great accuracy by means of symmetry balancing, without any movement of mechanical parts such as measuring drums, for example.

The arrangement may be reversed by arranging the rectangle rows without any stepped offset in the direction of motion of the measuring rule. In this case, however, the graduation lines of the rule must be given the form of steps, as shown in Fig. 6. The stepped lines coinciding with the direction of the rule must be offset in relation to each other by the $m\cdot n$th part of the measuring rule interval.

Instead of rectangles or squares, other figures may also be used, for example circular rings as shown in Fig. 7. When doing this, however, the measuring rule graduation lines must likewise be in the form of a row of equidistant circular rings or full circles, the centres of which are situated on the graduation line represented by the row of circles, as shown in Fig. 8. The distance between the individual vertical rows of figures on the measuring plate can then no longer be chosen as desired, but must correspond to the distance of the rings forming the graduation lines, whereby the projection ratio between the measuring rule and the image thereof on the measuring plate must be taken into consideration. The indicated values are read off by determining the circular ring of the measuring plate in which the image of the rule circle is centrically arranged and which in Fig. 7, for example, would be situated in the vertical circle row 5.

The invention is not limited to the embodiments previously described and illustrated, but comprises all possible variants. Especially, the arrangement is not limited to straight-line graduations but may also be used for reading circular graduations in an analogous manner.

I claim:

1. A reading device for measuring apparatus, particularly for the adjustment of machine tools, comprising a measuring scale graduation having graduation lines and a reading transverse measuring scale acting as reading scale cooperating with said graduation lines, said reading transverse measuring scale being composed of individual geometrical figures equal one another and arranged in a stepped formation having interspaces of constant width between said figures, the limiting lines of said individual geometrical figures running parallel with said graduation lines of said measuring scale graduation to be read off, so that after a rough reading of said measuring scale graduation a fine reading may be obtained by means of symmetry balancing of the graduation line referred to in relation to the interspace between said figures of said transverse measuring scale.

2. A reading device according to claim 1, wherein the side lines of said figures defining said interspaces are straight lines.

3. A reading device according to claim 1, wherein said figures forming said transverse measuring scale consist of rectangles.

4. A reading device according to claim 1, wherein said figures forming said reading transverse measuring scale consist of circular rings, the graduation lines of said measuring scale graduation being individual circles equal one another arranged with distances from each other corresponding to the interspace distances of said circular rings.

5. A reading device according to claim 1, wherein vernier lines are arranged contiguous to said graduation lines of said measuring scale graduation, said vernier lines cooperating with said figures of said reading transverse measuring scale.

References Cited in the file of this patent

UNITED STATES PATENTS

| | | |
|---|---|---|
| 1,775,952 | Turrettini | Sept. 16, 1930 |
| 1,864,895 | Egy | June 28, 1932 |
| 1,974,606 | Fassin | Sept. 25, 1934 |
| 2,188,014 | Rich | Jan. 23, 1940 |
| 2,188,038 | Egy | Jan. 23, 1940 |
| 2,422,611 | Becker et al. | June 17, 1947 |
| 2,488,351 | Turrettini | Nov. 15, 1949 |
| 2,638,031 | Stockwell | May 12, 1953 |